(No Model.)
E. CHRISTIANSEN.
PNEUMATIC TIRE.
No. 557,970. Patented Apr. 7, 1896.
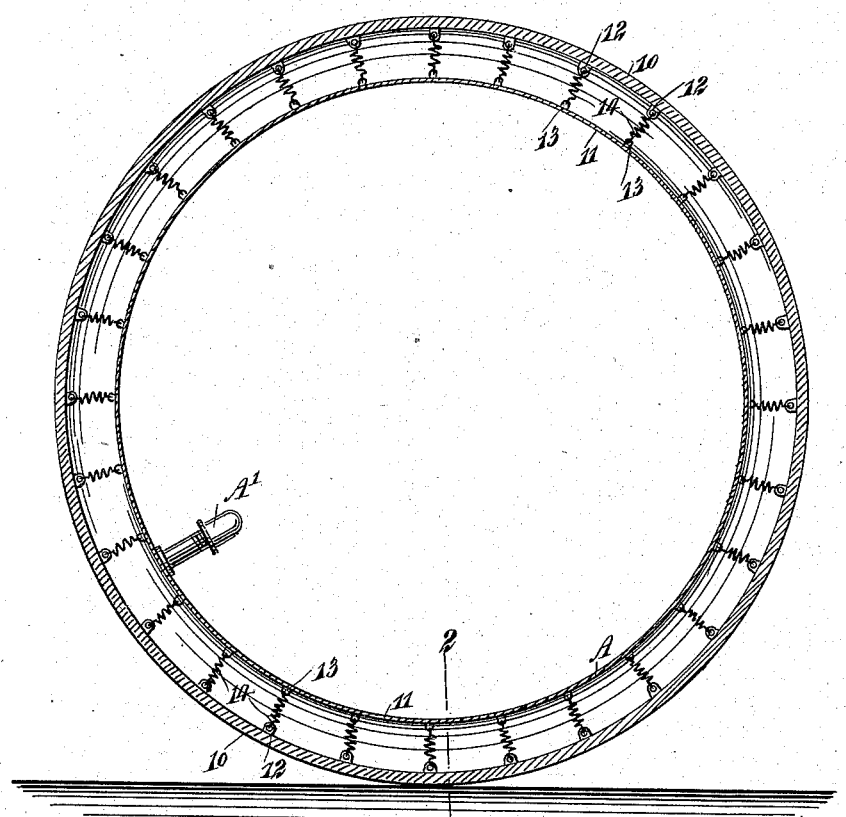
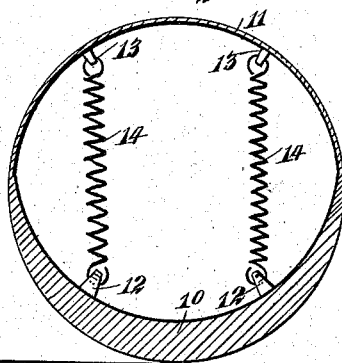
WITNESSES:
Chas. Njda
J. Fed. Feter
INVENTOR
E. Christiansen
BY Munn & Co
ATTORNEYS.

UNITED STATES PATENT OFFICE.

EMIL CHRISTIANSEN, OF LEAVENWORTH, KANSAS, ASSIGNOR OF ONE-TENTH TO EDWARD C. FRITSCHE, OF SAME PLACE.

PNEUMATIC TIRE.

SPECIFICATION forming part of Letters Patent No. 557,970, dated April 7, 1896.

Application filed October 19, 1895. Serial No. 566,175. (No model.)

*To all whom it may concern:*

Be it known that I, EMIL CHRISTIANSEN, of Leavenworth, in the county of Leavenworth and State of Kansas, have invented a new and useful Improvement in Pneumatic Tires, of which the following is a full, clear, and exact description.

My invention relates to an improvement in pneumatic tires; and the object of the invention is to provide a tire of this character which will not be readily punctured and which when punctured will not collapse; and a further object of the invention is to accomplish the foregoing results in a simple, durable, and economic manner and without adding materially to the weight of the tire.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both the figures.

Figure 1 is a vertical section through the improved tire, and Fig. 2 is a transverse section taken on the line 2 2 of Fig. 1.

In carrying out the invention the tire A is of the hose-pipe pattern, and is preferably made of rubber or a combination of rubber and fabric, and the tire is provided with a valve A', of any approved construction, through the medium of which the tire is to be inflated with air. The tire is much thicker at its tread than at its side and inner surface, the tread-surface being provided with a cushion 10, formed by increasing the thickness of the said tire upon its inner side, and the cushioned tread 10 gradually diminishes in thickness at its ends and merges into the rear and side sections 11 of the tire, these latter sections being preferably quite thin. By thus thickening the tread or cushioning the same such objects as tacks and fragments of glass or the sharp corners of stones will not penetrate into the interior of the tire when said tire is rolled over them.

Upon the inner surface of the cushion 10 of the tire, at each side of its transverse center, a number of lugs 12 are formed, and these lugs may be and preferably are of rubber and are integral with the tire, while corresponding and substantially similar lugs 13 are formed within the tire at the inner portion thereof, and these lugs 12 and 13 are connected by springs 14, the springs being one for each pair of opposing lugs, and the springs are of such length that even should the air escape from the tire in a manner that would collapse an ordinary tire the said springs will hold the said tire distended, and since a number of the springs are employed within the tire and placed at short intervals apart the tire may be used almost equally as well when not inflated as when inflated.

It will be seen that by arranging the springs 14 on opposite sides of the center of the cushion 10, and owing to the arc or curved form of said cushion, the cushion will exercise a spring influence as well as the springs, since the springs, resisting the upward movement of the cushion, will tend to throw the sides of said cushion downwardly, so as to flatten the outer portion of the tire, which tendency on the part of the springs will be resisted by the resilient character of the cushion 10.

Having thus described my invention, I claim as new and desire to secure by Letters Patent—

1. A tire, the same consisting of a resilient tube, the same having its outer portion thickened to form a cushion curved in cross-section and capable of being flattened upon the application of pressure, and a series of springs inclosed by the tube arranged part on each side of the center of the cushion, the said center of the cushion being farther from the outer ends of the springs than the sides of the cushion, substantially as described.

2. A bicycle-tire, consisting of a resilient cushion curved in cross-section and capable of being flexed upon the application of pressure, and a series of expansive springs arranged part on each side of the center of the cushion and bearing against the respective sides of the cushion, the central portion of the cushion being farther from the springs than the sides of the cushion, substantially as described.

EMIL CHRISTIANSEN.

Witnesses:
H. SHINDLER,
H. JANSEN.